(12) United States Patent
Van Den Bossche

(10) Patent No.: US 7,268,892 B2
(45) Date of Patent: Sep. 11, 2007

(54) METHOD AND DEVICE FOR THE VERIFICATION AND IDENTIFICATION OF A MEASURING DEVICE

(75) Inventor: Alex Van Den Bossche, Leuven (BE)

(73) Assignee: Metris IPR NV, Leuven (BE)

( * ) Notice: Subject to any disclaimer, the term of this patent is extended or adjusted under 35 U.S.C. 154(b) by 139 days.

(21) Appl. No.: 10/475,812

(22) PCT Filed: Apr. 24, 2002

(86) PCT No.: PCT/BE02/00061

§ 371 (c)(1),
(2), (4) Date: Oct. 24, 2003

(87) PCT Pub. No.: WO02/088630

PCT Pub. Date: Nov. 7, 2002

(65) Prior Publication Data

US 2004/0179205 A1 Sep. 16, 2004

(30) Foreign Application Priority Data

Apr. 24, 2001 (BE) ................................. 2001/0280

(51) Int. Cl.
*G01B 11/24* (2006.01)
(52) U.S. Cl. ..................................... 356/601
(58) Field of Classification Search ......... 356/601–613
See application file for complete search history.

(56) References Cited

U.S. PATENT DOCUMENTS 3,975,581 A * 8/1976 Lowenhar ..................... 333/33
5,973,770 A * 10/1999 Carter et al. ................ 356/4.09
5,973,788 A * 10/1999 Pettersen et al. ............ 356/614
6,871,527 B2 * 3/2005 Hansma et al. ............... 73/105

* cited by examiner

*Primary Examiner*—Tarifur Chowdhury
*Assistant Examiner*—Isiaka O Akanbi
(74) *Attorney, Agent, or Firm*—Browdy and Neimark PLLC

(57) ABSTRACT

The invention concerns a method and a reference object for the verification and identification of a measuring device for measuring the spatial position of one or several points situated in the measuring volume (9) of the measuring device, whereby the measuring device is calibrated, according to which calibration a mathematical model is calculated which makes it possible to determine the spatial position of a point perceived by the measuring device, whereby a reference object (1) with predetermined dimensions is provided in the measuring volume (9), and, next, the position of several points of this reference object (1) is determined by means of the measuring device, whereby the mutual situation of the thus determined position of the points of the reference object (1) is calculated and compared to the actual dimensions of the reference object (1) and, on the basis of the thus established deviations between the measured mutual position of the points of the reference object (1) and the actual dimensions of the reference object (1), said model is adjusted.

14 Claims, 1 Drawing Sheet

METHOD AND DEVICE FOR THE VERIFICATION AND IDENTIFICATION OF A MEASURING DEVICE

The invention concerns a method for the verification and identification of a measuring device for measuring the spatial position of one or several points situated in the measuring volume of the measuring device, whereby the measuring device is calibrated, according to which calibration a mathematical model is calculated which makes it possible to determine the spatial position of a point perceived by the measuring device.

The present measuring devices have to be calibrated again each time the measuring accuracy of the device is insufficient, for example as a result of thermal or mechanical shocks occurring during the conveyance of the measuring device. Such a calibration is very time-consuming and may take several days.

For optical measuring systems, which determine the position of a point by means of one or several cameras, a large number of points are measured during the calibration of the measuring device, situated in a grid with known dimensions. By means of the thus measured points is generated a mathematical model which makes it possible to calculate the three-dimensional co-ordinates of a point perceived by the cameras.

When the mutual positions of the cameras of the measuring device alter somewhat, for example due to thermal or mechanical loads during their conveyance, a measuring error in the order of magnitude of 0.5 mm may occur. According to the present state of the art, the measuring device must then be entirely calibrated again.

With conventional co-ordinate measuring machines ("CMM"), the points of an object whose dimensions or position needs to be determined, are touched by means of a measuring feeler mounted on a robot arm, in particular on what is called a manipulator. Should there be a collision between the object to be measured and the manipulator or the measuring feeler, a new calibration will be required. During such a calibration, one or several reference bars having a certified length are measured in turns according to the three orthogonal axes of the co-ordinate system used by the co-ordinate measuring machine, and subsequently the parameters of the co-ordinate measuring machine will be adjusted on the basis of the measurements which have been carried out on the reference bar. This is also a very time-consuming procedure.

The invention aims to remedy these disadvantages by proposing a method which makes it possible to improve the measuring accuracy of a measuring device in a very simple manner when the latter has been exposed to thermal or mechanical shocks or to other phenomenons of de-calibration, without any need for re-calibration arising.

To this aim, a reference object with predetermined dimensions is provided in the measuring volume, and then the position of several points of this reference object is determined by means of the measuring device, whereby the mutual situation of the thus determined position of the points of the reference object is calculated and compared to the actual dimensions of the reference object and, on the basis of the thus established deviations between the measured mutual position of the points of the reference object and the actual dimensions of the reference object, said model is adjusted.

Practically, the position of said points of the reference object is determined for different orientations of the reference object.

According to a preferred embodiment, reference points are provided on said reference object, and the position of these reference points is measured by means of the above-mentioned measuring device, such that the orientation and/or the position of the measuring object will be determined when the position of said points thereof is determined.

The invention also concerns a reference object for the application of the method according to the invention.

This reference object is characterised in that it comprises at least two reference elements whose mutual position is determined, whereby these reference elements are connected to one another via a connecting piece having a negligible thermal coefficient of expansion.

According to an advantageous embodiment of the reference object according to the invention, it will have reference points which make it possible to determine its movement. These reference points consist for example of light-emitting diodes (LED's).

Other particularities and advantages of the invention will become clear from the following description of a few specific embodiments of the method and the reference object according to the invention; this description is given as an example only and does not limit the scope of the claimed protection in any way; the reference figures used hereafter refer to the accompanying drawings.

In the different drawings, the same reference figures refer to identical or analogous elements.

Figure 1:
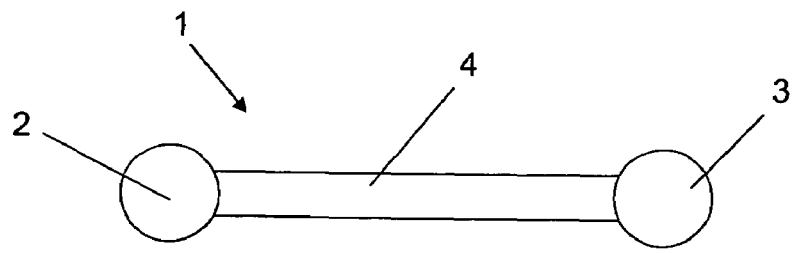
FIG. 1 is a schematic side view of a reference object according to a first embodiment of the invention.

FIG. 1 represents a first embodiment of the reference object according to the invention. This reference object 1 comprises two spherical reference elements 2 and 3 which are mutually connected by means of a connecting piece which is made of a longitudinal, round bar 4. This bar 4 is preferably made of carbon fibres and fibres made of polyparaphenylene terephthalamide, extending in the longitudinal direction of the bar 4 or which are wound in said bar 4 according to a cylindrical helical line. Said fibres made of polyparaphenylene terephthalamide are known under the brand name Kevlar®. The bar 4 may possibly consist of composition materials on the basis of these fibres.

The dimensions of the spherical reference elements 2 and 3 and their mutual distance and position are determined with great accuracy and possibly certified by an authorised institution.

In order to make sure that the length of the bar 4 is not temperature-dependent in any way, it is especially composed of fibres having a negative thermal expansion coefficient, such as for example fibres made of polyparaphenylene terephthalamide, and fibres having a positive thermal expansion coefficient, such as for example carbon fibres. The amount of fibres with a positive expansion coefficient and the amount of fibres with a negative expansion coefficient is selected such that the total expansion coefficient of the bar is practically equal to zero or at least negligible.

Thus, the percentage of the respective fibres is selected such that it is inversely proportionate to the respective expansion coefficient thereof.

In order to avoid any possible influences of the atmospheric humidity on the qualities of the bar 4, the latter is preferably covered with a waterproof coating.

Each of the spherical reference elements 2 and 3 consists of a spherical ball made for example of ceramics, steel or artificial ruby.

According to the method of the invention, such a reference object is used for the verification and the identification of a measuring device. During the verification will be checked whether the measuring device allows for a correct measuring and makes it possible to determine the position with the required accuracy. Said accuracy is for example in the order of magnitude of 0.05 mm for a measuring volume of 10 m$^3$.

During the identification, the model of the measuring device which has been determined during the calibration thereof is adjusted somewhat on the basis of the result of said verification in order to obtain the required measuring accuracy. This is done for example by calculating the value of parameters of said model and their influence on the recorded measuring, and by subsequently adjusting these parameters in the model. In an optical measuring system, such parameters may for example be the mutual position of and the angles between the different cameras, or the lens qualities of the cameras, etc.

Figure 2:
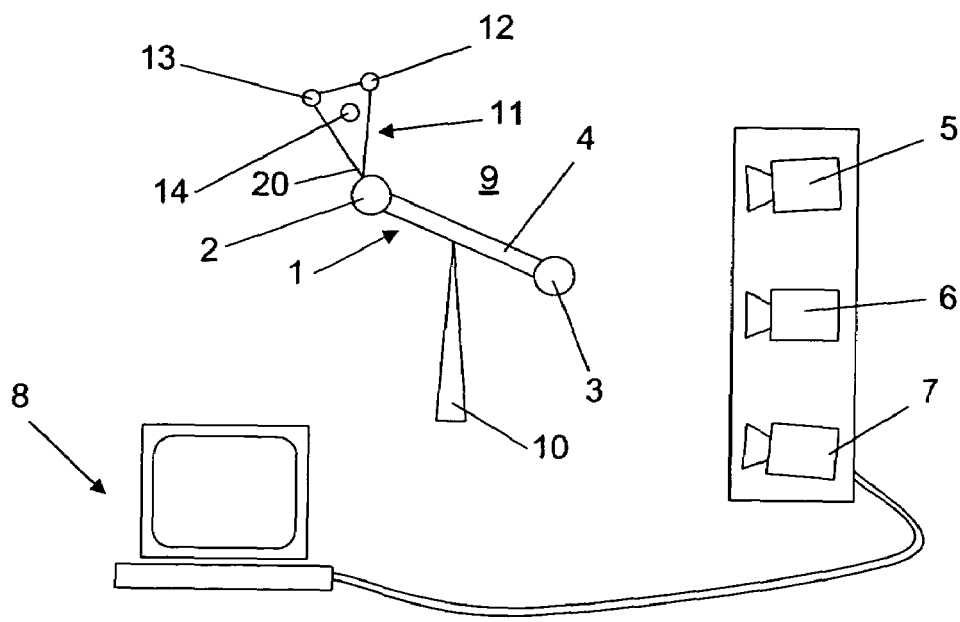
FIG. 2 is a schematic representation of a measuring device with a reference object according to the invention.

FIG. 2 schematically represents a measuring device by way of example. This measuring device consists of an optical measuring system with three cameras 5, 6 and 7, co-operating with the arithmetic unit of a computer 8. The space situated within the field of vision of the cameras 5, 6 and 7, in which the position of the points can be measured by means of the measuring device, forms what is called a measuring volume 9.

When measuring the spatial position of the points situated in the measuring volume 9, use is made of a holder 11 upon which are provided several reference points 12, 13 and 14, each formed of a light-emitting diode. The holder 11 comprises a measuring feeler 20 with which it is placed against a point of an object to be measured. Next, the position of the reference points 12, 13 and 14 of the holder 11 is measured, in order to determine the position and orientation of the latter, and consequently find out the position of the measured point. Such a holder 11 is known as such and is described for example in patent document WO 98/48241.

As explained in the introduction of the description, such a measuring device is calibrated by measuring the position of a large number of points situated in an orthogonal grid whose dimensions are known. By means of the thus measured points is generated a mathematical model which makes it possible to determine the three-dimensional co-ordinates of any point whatsoever situated in the above-mentioned measuring volume 9.

After the measuring device has been conveyed, or if it has been subject to thermal shocks, a verification and an identification of the measuring system will be required. A reference object 1 is hereby placed in the measuring volume 9, and the known dimensions thereof are measured by means of the measuring system. The reference object 1, which is represented in FIG. 2, has already been described above.

This reference object 1 is mounted on a standard 10, such that it can take a fixed position in said measuring volume 9. Next, the positions of a number of points on the surface of the spherical reference elements 2 and 3 are measured by means of the above-mentioned holder 11.

Preferably, the position of at least four points of each reference element 2 and 3 is measured, such that, by means of the above-mentioned computer, the exact surface and possibly the middle point thereof can be calculated, as well as the distance between these reference elements 2 and 3 and their respective diameters.

The dimensions of the reference object 1 which are thus determined by means of the measuring device are then compared to its exact dimensions. In particular, the distance between the reference elements 2 and 3 measured by the measuring device is compared to the actual distance between them which was determined beforehand.

This measuring of the reference object 1 and the comparison to its actual dimensions is preferably carried out for different orientations or positions of the reference object 1 in the above-mentioned measuring volume 9. Thus, the reference object 1 must not extend according to the orthogonal axes used by the measuring device, and the reference object 1 can for example be measured according to some arbitrary orientations.

On the basis of the thus established deviations of the measuring results in relation to the actual dimensions of the reference object 1, the above-mentioned mathematical model is finally adjusted somewhat, for example by applying a correction factor for certain parameters thereof, so as to improve the accuracy of the measuring device, such that it is just as good as the measuring accuracy obtained after a calibration of the measuring device. When for example one of the cameras of the measuring system has moved over a certain angle in relation to the other cameras due to a mechanical shock, the influence thereof is rectified by rectifying the above-mentioned model, on the basis of the established deviations, without any entirely new calibration of the device being required.

The method above can possibly be repeated several times, such that an iterative process is obtained for the adjustment of said mathematical model.

In some cases, the only thing that is required is the identification of certain parameters of the measuring device, namely of those parameters which have for example the greatest influence on the accuracy of the position measurements, such as the mutual angles of the cameras in an optical measuring device. In such a case, only these parameters will be adjusted in said mathematical model at the time of the identification.

By making use of the above-mentioned holder 11 to determine the dimensions and the mutual position of the reference elements 2 and 3 of the reference object 1, measuring errors occurring due to the use of this holder 11 during the measurement of the position of the points in the above-mentioned measuring volume 9, and which have possibly not been taken into account during the calibration of the measuring device, are rectified as well.

Figure 3:
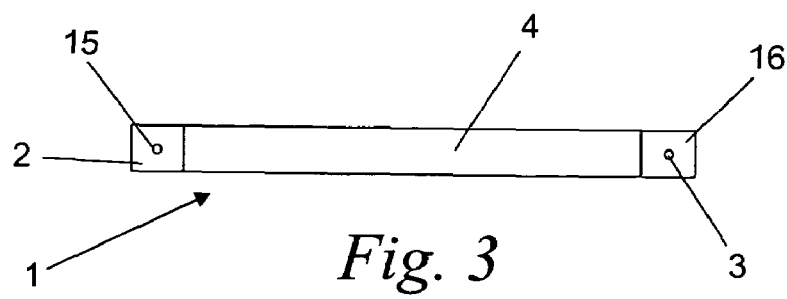
FIG. 3 is a schematic side view of a reference object according to a second embodiment of the invention.

The above-mentioned reference object can be made in all sorts of shapes and dimensions. FIG. 3 represents a second embodiment of the reference object 1 according to the invention. This reference object 1 differs from the preceding embodiment in that each of said reference elements 2 and 3 are formed of a plate in which is provided a recess 15, 16 respectively, for example in the shape of a cylindrical bore hole. The dimensions of these recesses 15 and 16 are selected such that a measuring feeler, provided on the above-mentioned holder 11, can be provided in these recesses 15 and 16 such that it practically fits.

Thus, with the method according to the invention, the distance between these two recesses 15 and 16 is measured by means of said holder 11 by successively placing the measuring feeler in each of these recesses and thus determining their position.

On the basis of the deviations found between the measured distance between said recesses 15 and 16 and the actual value of this distance, the above-mentioned mathematical model is adjusted.

Figure 4:
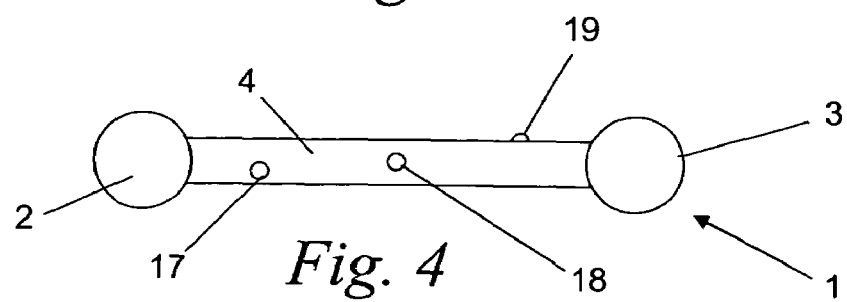
FIG. 4 is a schematic side view of a reference object according to a third embodiment of the invention.

FIG. 4 represents a third embodiment of the reference object 1 according to the invention. This reference object 1 corresponds to the reference object represented in FIG. 1, but it is further provided with reference points 17, 18 and 19 which can be observed by the above-mentioned cameras. Each of these reference points 17, 18 and 19 is preferably formed of a light-emitting diode (LED).

The use of such a reference object 1 offers the advantage that, when the method according to the invention is applied, it is not necessary to hold this reference object in a fixed position in the measuring volume 9 when the distance between the reference elements 2 and 3 thereof is determined by means of the measuring device.

The reference object 1 is thus mounted in said measuring volume 9, for example in a non-fixed manner, or it is held by a person in this measuring volume 9, while the position of the reference elements 2 and 3 is being determined by means of the measuring device. The position of the reference points 17, 18 and 19 of the reference object 1 is hereby observed as well by said cameras of the measuring device, and thus the position of these reference points 17, 18 and 19 is measured. Thus, for each measurement of the position of a point of a reference element 2 or 3, the corresponding position and orientation of the reference object 1 will be determined.

This makes it possible for the above-mentioned person, holding the reference object 1, to hold the latter in another position, for example after the position of the first reference element 2 has been measured, in order to determine the position of the second reference element 3.

The distance between the two reference elements 2 and 3 is then calculated by the measuring device, whereby the corresponding measured relative positions and orientations of the reference object 1 are taken into account.

Next, as described above, the thus calculated distance between the reference elements 2 and 3 is compared to the actual distance, and the above-mentioned mathematical model is adjusted.

Although the embodiment of the reference object, represented in FIG. 4, has three reference points, it is also possible to provide more than three reference points. It is also possible for the reference object 1 to have only one or two reference points when the position of the bar 4 is moved over short distances during the measurement, for example in the order of magnitude of 1 mm.

It is clear that the mutual position of the reference points 17, 18 and 19 on the reference object is not relevant, since only the relative position of each reference point is measured. The only thing required is that their mutual distance is sufficiently large so as to allow for an accurate determination of the position of the reference object 1.

During the measurements carried out with the measuring device according to the method of the invention, the reference points 12, 13, 14, 17, 18 and 19 are preferably measured in turns.

When, during these measurements, the reference points are measured simultaneously, the different reference points are for example discerned by means of time-division multiplexing. This technique is known as such.

Although the description above is related to an optical measuring system, the method and the reference object can be applied in all sorts of measuring devices to determine the spatial position of the points of an object. In particular, the method and the reference object according to the invention are not only suitable to be applied in optical measuring systems, but for example also in co-ordinate measuring machines.

The method and the reference object according to the invention are particularly interesting to be applied in optical measuring devices whereby use is made of for example two or several flat cameras or three or more linear cameras, or a combination of both of these.

Naturally, the invention is not restricted to the above-described embodiments of the reference object and of the method according to the invention represented in the accompanying drawings. Thus, the reference object may for example simply consist of a bar having a known length, and the reference elements consist of the far ends of this bar.

The above-mentioned reference points cannot only be formed of light-emitting diodes (LED's), such as for example infrared LED's, but they can also be formed of reflectors or coloured markings.

Further, the reference object can be equipped with more than two reference elements, and they can have all sorts of shapes whatsoever, such as for example the shape of a cube, a tetrahedron, a cone, a hemisphere, etc.

The invention claimed is:

1. A method for the verification and identification of an optical measuring device for measuring, by means of one or several cameras, the spatial position of one or several points situated in the measuring volume (9) of the measuring device, whereby the measuring device is calibrated, according to which calibration a mathematical model is calculated which makes it possible to determine the spatial position of a point perceived by the measuring device, comprising, providing, during a verification of the measuring device, a reference object (1) with predetermined dimensions and with position in the measuring volume (9), determining the mutual position of the reference elements (2,3) by measuring the position of one or several points on the reference elements (2,3) by means of the measuring device, the step of determining comprising placing a holder (11), upon which are provided reference points (12,13,14), against said one or several points on said reference elements (2,3) and measuring the position of these reference points (12,13,14) in order to determine the position of the holder (11), and calculating the mutual situation of the thus determined position of the reference points of the reference object (1) based on the measured points comparing the calculated mutual situation of the thus determined position of the reference points of the reference object (1) to the actual dimensions of the reference object (1), wherein reference points (17,18,19) are provided on said reference object (1) and the position of these reference points (17,18,19) is observed by said cameras of the measuring device to measure the position of these points, such that the orientation and the position of the reference object (1) is determined for each measurement, by means of said holder (11), of the position of said points of the reference elements (2,3), and wherein the relative movement of the reference points (17,18,19) of the reference object (1) and thus of the reference object (1) is determined, and wherein during an identification of the measuring device, on basis of the thus established deviations between the measured mutual position of the points of the reference object (1) and the actual dimensions of the reference object (1), said model, that has been determined during the calibration of the measuring device, is adjusted.

2. The method according to claim 1, wherein the position of said points of the reference elements (2,3) is determined for different positions and/or orientations of the reference object (1).

3. The method according to claim 1, wherein use is made of an optical measuring device having two or more flat cameras or three or more linear cameras, or a combination of both of these.

4. The method according to claim 1, wherein the above-mentioned mathematical model is only adjusted for those parameters of the measuring device which make the largest contribution to said deviations, whereby these parameters are for example the mutual angles of the cameras in an optical measuring device.

5. The method of claim 1, wherein said reference elements (2,3) are connected to one another by means of a connecting piece (4).

6. The method according to claim 5, wherein said connecting piece consists of a bar (4).

7. The method according to claim 5, wherein said reference elements (2,3) are at least partially spherical, cube-shaped or conical or consist of a bore hole.

8. The method according to claim 5, wherein said connecting piece (4) mainly consists of carbon fibres having a negative thermal expansion coefficient, and of carbon fibres having a positive thermal expansion coefficient, in such a ratio that its total expansion coefficient is negligible, whereby these fibres preferably extend practically mainly parallel to an imaginary connecting line between said reference elements.

9. The method according to claim 5 wherein each of said reference points (17,18,19) is formed of an LED, in particular of a light source.

10. The method according to claim 5, wherein said connecting piece (4) has a thermal expansion coefficient which is negligible.

11. The method according to claim 6, wherein said reference elements (2,3) are at least partially spherical, cube-shaped or conical or consist of a bore hole.

12. The method according to claim 11, wherein said connecting piece (4) mainly consists of carbon fibres having a negative thermal expansion coefficient, and of carbon fibres having a positive thermal expansion coefficient, in such a ratio that its total expansion coefficient is negligible, whereby these fibres preferably extend practically mainly parallel to an imaginary connecting line between said reference elements.

13. The method according to claim 6, wherein said connecting piece (4) mainly consists of carbon fibres having a negative thermal expansion coefficient, and of carbon fibres having a positive thermal expansion coefficient, in such a ratio that its total expansion coefficient is negligible, whereby these fibres preferably extend practically mainly parallel to an imaginary connecting line between said reference elements.

14. The method according to claim 1, wherein use is made of an optical measuring device having two or more flat cameras or three or more linear cameras, or a combination of both of these.

* * * * *